(12) United States Patent
Koertge et al.

(10) Patent No.: US 9,983,019 B2
(45) Date of Patent: May 29, 2018

(54) METHOD FOR OPERATING A NAVIGATION SYSTEM, NAVIGATION SYSTEM AND MOTOR VEHICLE

(71) Applicant: Bayerische Motoren Werke Aktiengesellschaft, Munich (DE)

(72) Inventors: Harald Koertge, Munich (DE); Dominik Gusenbauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 218 days.

(21) Appl. No.: 14/941,722

(22) Filed: Nov. 16, 2015

(65) Prior Publication Data

US 2016/0069700 A1  Mar. 10, 2016

Related U.S. Application Data

(63) Continuation of application No. PCT/EP2014/059105, filed on May 5, 2014.

(30) Foreign Application Priority Data

May 17, 2013  (DE) .......................... 10 2013 209 168

(51) Int. Cl.
 *G01C 21/36* (2006.01)
(52) U.S. Cl.
 CPC ...... *G01C 21/3605* (2013.01); *G01C 21/3611* (2013.01); *G01C 21/3664* (2013.01)
(58) Field of Classification Search
 CPC .............. G06F 17/30241; G06F 17/30; G06F 11/3604; G06F 17/3002; G06F 17/30041;
 (Continued)

(56) References Cited

U.S. PATENT DOCUMENTS 6,442,479 B1 * 8/2002 Barton ................... G01C 21/28
 340/990
8,150,885 B2 * 4/2012 Keith, Jr. .......... G06F 17/30327
 707/797
(Continued)

FOREIGN PATENT DOCUMENTS

DE  10 2006 057 921 A1  6/2008
DE  10 2007 003 115 A1  7/2008
(Continued)

OTHER PUBLICATIONS

International Search Report (PCT/ISA/210) issued in PCT Application No. PCT/EP2014/059105 dated Aug. 12, 2014 with English translation (Four (4) pages).
(Continued)

*Primary Examiner* — Jelani A Smith
(74) *Attorney, Agent, or Firm* — Crowell & Moring LLP

(57) ABSTRACT

A method is provided for operating a navigation system of a motor vehicle for searching for possible destinations, wherein a processing device of the navigation system is used: to receive a search input from a user, to search a first database and a second database for suitable database entries in each case on the basis of the search input and in this case to provide a first and a second results list of suitable database entries. The first database stores database entries that indicate geographical regions, and the second database stores database entries that indicate road names and/or special destinations. For each road name and/or special destination the second database indicates a reference to at least one geographical region. The processing devices determine entry pairs that each contain a database entry from the first results list and a database entry from the second results list as the possible destinations.

18 Claims, 5 Drawing Sheets

(58) Field of Classification Search
CPC ......... G06F 17/30327; G06F 17/30566; G06F 17/30607; G06F 21/6227; G06F 3/0237; G06F 3/048; G06F 8/60; G06F 8/64; G06F 9/4411
See application file for complete search history.

(56) References Cited

U.S. PATENT DOCUMENTS

| | | | |
|---|---|---|---|
| 2005/0050035 A1* | 3/2005 | Ono | G01C 21/36 |
| 2008/0046396 A1 | 2/2008 | Gelhar | |
| 2008/0288545 A1* | 11/2008 | Hegedus | G01C 21/343 |
| 2009/0024656 A1* | 1/2009 | Wellman | G06F 17/30241 |
| 2012/0254143 A1* | 10/2012 | Varma | G06F 17/30401 |
| | | | 707/706 |
| 2014/0081922 A1* | 3/2014 | Kunath | G06F 17/30241 |
| | | | 707/679 |
| 2014/0244665 A1* | 8/2014 | Hartford | G06F 17/30241 |
| | | | 707/749 |

FOREIGN PATENT DOCUMENTS

| | | |
|---|---|---|
| DE | 10 2010 005 502 A1 | 7/2011 |
| EP | 2 241 983 A1 | 10/2010 |
| EP | 2 354 984 A1 | 8/2011 |
| EP | 2 581 704 A1 | 4/2013 |

OTHER PUBLICATIONS

German-language Search Report issued in counterpart German Application No. 10 2013 209 168.0 dated Jan. 15, 2014 with partial English translation (Ten (10) pages).

* cited by examiner

METHOD FOR OPERATING A NAVIGATION SYSTEM, NAVIGATION SYSTEM AND MOTOR VEHICLE

CROSS REFERENCE TO RELATED APPLICATIONS

This application is a continuation of PCT International Application No. PCT/EP2014/059105, filed May 5, 2014, which claims priority under 35 U.S.C. § 119 from German Patent Application No. 10 2013 209 168.0, filed May 17, 2013, the entire disclosures of which are herein expressly incorporated by reference.

BACKGROUND AND SUMMARY OF THE INVENTION

The invention relates to a method for carrying out a search for possible destinations by means of a navigation system of a motor vehicle. The invention furthermore relates to a navigation system and a motor vehicle with a navigation system, wherein the navigation system is designed to carry out a method of this type.

Navigation systems for motor vehicles are already known from the prior art and serve to output navigation instructions which support the driver in guiding the motor vehicle to a specific destination. Interest is focused here on the performance of a search for possible navigation destinations in a navigation database of a navigation system. In this context, it is already known, for example, that the required navigation destination can be found via a hierarchical destination input. Here, the user must first enter the country and the required town or the zip code in order then to be able to define the required street and house number more specifically. Furthermore, navigation systems are also known in which navigation destinations can be found by means of a full-text search using a character string that is as unambiguous as possible. A full-text search of this type is particularly user-friendly and enables the required destination to be found with only a single destination input.

A navigation system is known from DE 10 2006 057 921 A1 in which a list of possible navigation destinations is proposed on the basis of a combination of letters entered by the user. After each input of a character or group of characters, a search is already carried out in a database on the basis of the partial input entered so far by the user. A search unit provided for this search can carry out a free-text search or a full-text search in the database on the basis of a full-text index. The search can be restricted to navigation destinations that are located within a predetermined radius around the current position of the navigation device.

DE 10 2010 005 502 A1 describes a method for carrying out a search in an infotainment system of a motor vehicle, wherein the infotainment system has a plurality of functionalities that can be invoked by actuating one of the fixed-function operating elements assigned to the respective functionality. A search for folders, files or data content is performed in a predetermined search field on the basis of an alphanumeric input of a user, and the search results are displayed on a display device for this predetermined search field. If the actuation of a fixed-function operating element is then detected, the search field is modified on the basis of the actuation, and new search results for this new search field are displayed.

A method for carrying out a full-text search in a database of a navigation system is furthermore known from EP 2 354 984 A1. In order to be able to design the full-text search in a less complex manner, a plurality of index tables are used which are interlinked via a higher-order table. Along with the actual, unique object designations for navigation destinations, a single database entry can also contain category data indicating, for example, that a specific navigation destination is a restaurant.

The fact that databases of navigation systems have a relatively complex structure and are therefore relatively large can be regarded as a disadvantage of the known navigation systems. This, in turn, has the effect that the performance of the search can take a very long time overall, since the entire database must be searched in each case in a complex manner for the required destination. Furthermore, a correspondingly large main memory into which the database must be loaded during the search is required for the processing of the large navigation database. However, main memories of this type are available to only a limited extent, particularly in motor vehicles.

The object of the invention is to provide a way in which, in a method of the aforementioned type, processing and/or data complexity can be reduced compared with the prior art during the search for possible destinations.

This and other objects are achieved by a method, by a navigation system and by a motor vehicle according to embodiments of the invention.

A method according to the invention serves to operate a navigation system of a motor vehicle for a search for possible destinations. The navigation system contains a first and a second database. Database entries indicating the geographical regions or areas are stored in the first database. In contrast, database entries indicating street names and/or special destinations are stored in the second database, wherein a reference to at least one geographical region from the first database is indicated in the second database in addition to each street name and/or special destination. A search input which a user performs with an input device is received by way of a processing device of the navigation system. The first database is then searched for matching database entries by way of the processing device depending on the search input, and a first results list of matching database entries is provided here. Independently therefrom, the second database is also searched for matching database entries depending on the same search input, and a second results list of matching entries is provided here. The database entries from the second results list are then allocated to the database entries from the first results list using the references. The database entries from the second results list are allocated in each case to the database entry from the first results list to which the respective reference refers. Entry pairs are thus determined, which in each case contain a database entry from the first results list and a database entry from the second results list. A selection list comprising the entry pairs as the possible destinations is then displayed on a display device so that the user can select one of the displayed destinations. If a specific destination is selected, the processing device calculates a corresponding navigation route via which the motor vehicle can be guided to the selected destination.

It is thus proposed according to the invention to design the navigation system in such a way that the data are arranged in two different databases, in fact in such a way that only geographical regions in the form of a list are stored in the first database, whereas the unique, specific street names and/or special destinations are stored in the second database, in each case with a reference to at least one geographical region to which the respective street or the respective special destination geographically belongs. By use of a data structure of this type, an search index is produced on the whole in which the respective database can be searched via a linear search so that the search for the possible destinations can be carried out with a runtime complexity of O(n). On the one hand, the time requirement compared with other database structures is significantly reduced; on the other hand, the size of the two databases is also relatively small. Accordingly, no large main memory is required in the motor vehicle.

On the one hand, a first results list of database entries from the first database and, on the other hand, a second results list of database entries from the second database are therefore generated by the processing device depending on the search input. The found street names and/or special destinations are then matched with the found geographical regions using the respective references. If it is established here that the reference of a found street and/or special destination refers to a region which is not contained in the results list, these database entries can be discarded.

The method according to the invention can be explained using the following example: The two terms "München Hanau" ["Munich Hanau"] are entered by the user as a search input. The processing device then searches the first database and finds both the town "München" and the town "Hanau" as geographical regions. The first results list thus contains the two towns: "München" and "Hanau". The processing device also searches the second database and finds "Münchener Strasse" and "Hanauer Strasse" there. The second results list therefore contains the two streets: "Münchener Strasse" and "Hanauer Strasse". In an allocation, the processing device establishes that in the case of "Hanauer Strasse", a reference is given to the town "München", whereas no such reference to the town "Hanau" is given in the case of "Münchener Strasse". The only possible entry pair from these two results lists is therefore: "Hanauer Strasse in München". This destination is then displayed on the display device.

The database entries of the second database can, in each case, additionally contain a reference to a navigation map in order to then be able ultimately to resolve individual destinations geographically. Alternatively, the database entries of the second database can also be referenced from the navigation map, provided that the data format of the navigation map permits or provides this.

In one embodiment, it is provided that the database entries, i.e. the street names and/or special destinations, are stored in alphabetical order in the second database. The time required for the search can thus be reduced to a minimum in the case of a linear search.

It proves to be advantageous if the geographical regions indicated in the first database are arranged hierarchically into at least two hierarchy levels so that, for each region of a specific hierarchy level, a plurality of regions belonging geographically to this region are allocated to a hierarchy level subordinated thereto. The hierarchical structure may, for example, be formed according to a national administrative division which designates the vertical administrative structures existing in each case in the different countries. A total of ten different hierarchy levels, for example, can be provided. A first hierarchy level, a main level, may, for example, contain the countries, i.e., for example, "Germany", "France", "Austria" and the like. The countries may in turn be subdivided into federal provinces, which then form a second hierarchy level. The federal provinces can then contain the respective further administrative units as a third hierarchy level, and so on.

In terms of the required search time, it has proven to be advantageous if the geographical regions indicated in the first database are stored in a tree structure in such a sequence that a specific region is immediately followed by all subordinated regions belonging to this region. In this way, the regions subordinated to a specific region can be found particularly quickly in the database. The regions within the same hierarchy level are preferably arranged in alphabetical order.

If a region from a specific hierarchy level is found depending on the search input of the user, all regions subordinated to this region are preferably additionally included in the first results list. If, for example, the region "Bad Tölz" is found using the search input, the subordinated regions "Bad Tölz Center", "Bad Tölz South" and "Bad Tölz East" are also included in the first results list. In this way, a very precise and simple allocation of the found street names and/or special destinations to the corresponding region is enabled. For example, it can also be provided that the specified references that are indicated in the second database refer to the smallest region, i.e. to the region from the last hierarchy level, in which the respective street and/or the respective special destination is located.

Additionally or alternatively, if a specific region and a region subordinated to it are found depending on the search input, it can also be provided that only the subordinated region is included in the first results list. The processing time in the search is thus furthermore reduced. If, for example, the search input "Bad Tölz Center" is received, only the region "Bad Tölz Center" is included in the first results list, but not the higher-order region "Bad Tölz".

In one preferred embodiment, the first and/or the second database is/are stored in a data memory in compressed, in particular delta-compressed, form. The required memory space is thus reduced to a minimum. This embodiment proves to be particularly advantageous, particularly in relation to the second database in which the street names and/or the special destinations are stored. The second database contains significantly more database entries than the first database, so that a large amount of memory space is saved on the whole through the compression of the second database. A delta compression may, for example, appear such that, for each database entry, a number is initially defined which indicates how many initial letters from the immediately preceding database entry are to be accepted. If, for example, the following two database entries "Aachener Strasse" and "Aachener Weg" are stored in compressed form, the second database entry can consequently be stored: "9 Weg". This means that the first nine letters of the second database entry are accepted from the preceding entry.

It can be provided that the first and/or the second database is/are subdivided into a plurality of subdatabases in which a subset of the database entries is, in each case, stored. Each subdatabase can be provided in each case in the form of a separate file which is stored in a data memory. The subdivision of the first and/or second database into a plurality of subdatabases offers the advantage that the processing device can load the individual subdatabases dynamically during the performance of the search, so that an improved storage utilization is achieved overall. A smaller main memory is therefore also required, and the search time is furthermore reduced. The provision of a plurality of subdatabases also has advantages in terms of updating the database. Only partial updates can be carried out, so that the entire database does not need to be updated. The subdivision into a plurality of subdatabases may be undertaken, for example, for larger geographical areas, such as, for example, for the USA.

If one of the databases is subdivided into a plurality of subdatabases, the processing device can load or copy at least one of the subdatabases from a non-volatile memory in which the first and the second database are stored into a volatile main memory during the search for the possible destinations, and can then search for the matching database entries in the subdatabase of the main memory. For example, the subdatabases can be loaded and searched one after another or temporally in parallel. However, with a specific search input, not all subdatabases need to be searched, but only those which are assessed as plausible for the received search input. This embodiment generally ensures a further acceleration of the search.

As already explained, the search of the first and/or the second database can be carried out by means of a linear search, in particular with a skip function. With a skip function, individual entries in the list can be passed over. This also reduces the search time.

The selection list is preferably generated in real time: In one embodiment, if the search input is continuously edited or completed in an input field by the user, it is provided that, a previously performed partial input is already repeatedly received in each case by the processing device during the search input and the selection list is continuously updated depending on the respective current partial input. In particular, the selection list can be updated after each new character or each new search term of the search input depending on the respective current partial input. The user thus receives the possible destinations displayed in the selection list without having to complete or confirm the search input. If the found possible destinations are prioritized accordingly, it may even be possible for the required destination to be displayed already following the input of a few characters, so that the effort required by the user in searching for his required destination is minimal.

It is preferred if a priority value is assigned in each case to the possible destinations that are found by the processing device and displayed in the selection list. The sequence of the possible destinations in the selection list can then be determined depending on the priority values. In this way, it is possible to display the possible destinations that currently appear to be more plausible than other destinations in foremost position in the selection list. A procedure of this type is particularly user-friendly, since the user first receives the plausible destinations displayed and can quickly find his required destination accordingly.

In terms of the prioritization of the found destinations, it has furthermore proven to be advantageous if the aforementioned priority values are determined depending on at least one of the following parameters.

In one embodiment, the priority values can be determined depending on a frequency with which the respective destination has previously been selected for the calculation of a navigation route by the user. If one specific destination has been more frequently selected than other destinations, this destination can be displayed further in front in the selection list than the other destinations, so that the user can find this popular destination without much effort and can quickly enter it.

Additionally or alternatively, the priority values can be determined depending on a current position of the motor vehicle. The current geographical position of the motor vehicle represents a parameter which plays a certain role in the assessment of the plausibility of the found destinations.

The priority values may, for example, be determined depending on a distance to the respective destination from the current geographical position of the motor vehicle. For example, those destinations which are closer to the current position of the motor vehicle can be displayed higher in the selection list than the other destinations. This embodiment exploits the fact that the destinations which are located at a relatively great distance from the motor vehicle are selected on the whole less frequently than the closer destinations.

Furthermore additionally or alternatively, it can be provided that the priority values are determined depending on a degree of correspondence between the respective destination and the search input of the user. Here, the relationship may apply that the greater the degree of correspondence, the higher the respective destinations are displayed in the selection list.

The priority values can additionally or alternatively also be determined depending on a type, in particular an administrative type and/or the category (e.g. POI) of the respective destination. Thus, for example, towns or smaller regions can be prioritized differently from streets or special destinations. For example, it may be that the more precise and unambiguous the destination is, the higher this destination is displayed in the selection list.

If a town is found as a possible destination, the priority value may also be determined depending on a number of inhabitants of the town.

The aforementioned parameters may be taken into account in determining the priority values, for example with a predefined weighting.

The user may also be offered the facility to include the displayed possible destinations individually in a favorites list. In a subsequent later search, those destinations which are included in the favorites list can then be placed in foremost position.

If the search input includes a plurality of search terms (referred to as "tokens") which are entered separated from one another by a blank space or other separating character, the processing device can search the two databases independently from the sequence of the input of the search terms. The search input "München Hanauer Strasse 46" therefore leads overall to the same selection list as, for example, the search input "Hanauer Strasse 46 München" or "46 Hanauer Strasse München". Street names which start with a number, for example "50th Avenue" are preferably also supported. These street names can also be indicated at any position in the search input.

The processing device preferably supports incomplete and/or incorrect search inputs also. Such a situation may arise, for example, if the search term "Munch" or "Munchen" is entered instead of "München". The processing device can determine a degree of similarity between the entered search terms and the stored database entries and can compare this degree of similarity with a predefined threshold. If the degree of similarity exceeds this threshold, the found database entry is selected.

If a plurality of search terms are entered, the processing device can optionally also combine specific search terms. For example, this can be carried out if the terms "Hanauer Strasse" are entered in the search. These two search terms can be combined so that a search is carried out in the databases for "Hanauer Strasse".

On the whole, the method according to the invention enables a flexible and complete search for possible destinations with a runtime complexity of O(n). The search results are evaluated on the basis of different parameters and are finally provided in a selection list sorted according to the user context. The method is based on an improved data format for the search index which is divided into two different databases or tables: on the one hand, the geographical regions ("Area Hierarchy") and, on the other hand, the street names and/or special destinations ("Streets/POI Hierarchy"). The databases are created for the search index, for static data, in particular in a compilation step in the manufacture/programming of the navigation system. For dynamic changes to the output data, such as, for example, the contact data defined by the user himself, parts of the search index are recompiled in the operation of the motor vehicle and are adapted accordingly. The decisive advantage of the method lies, in particular, in the processing of the databases and in the data format for the search index. On the one hand, the first and/or the second database is stored in highly compressed form in order to occupy the smallest possible amount of memory space in the motor vehicle; on the other hand, the search index is created as completely as possible for all relevant destinations (addresses, POIs, contacts, etc.) and is optimized for fast queries during the search. In particular, memory space can be saved by use of this data format. The larger second database thus requires only 8 MB for all street names and special destinations in Germany, whereas some 300 MB would be required for the same information in the NDS Free Text Search Building Block.

The invention furthermore relates to a motor vehicle, in particular an automobile, with a navigation system that is designed to carry out a method according to the invention. The preferred embodiments presented in relation to the method according to the invention and their advantages apply accordingly to the motor vehicle according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
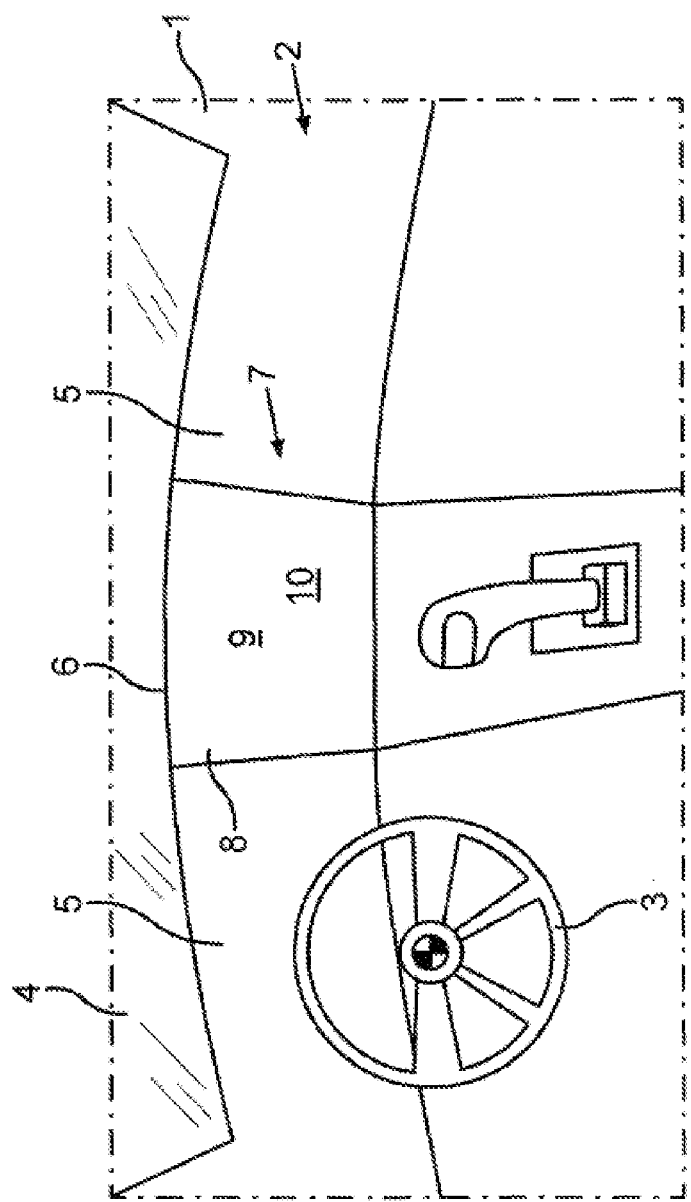
FIG. 1 is a schematic representation of a front area of a passenger compartment of a motor vehicle with a navigation system according to one embodiment of the invention.

With reference to FIG. 1, a motor vehicle 1, designed as an automobile, includes a passenger compartment 2, the front area of which is shown schematically in FIG. 1. A steering wheel 3 which is disposed between a windscreen 4 and a driver's seat (not shown) and serves to steer the front wheels of the motor vehicle 1 is located in a manner known per se on a driver's side. A dashboard 5, extending in the transverse direction of the vehicle over the entire width of the passenger compartment 2 and having an associated center stack 6, is disposed between the windscreen 4, on the one hand, and the steering wheel 3 on the other hand. The center stack 6 is located centrally between the driver's seat and the front-passenger seat.

An infotainment system 7, which can be operated in different operating modes, such as, in particular, in a navigation mode, a telephony mode and the like, is permanently installed in the motor vehicle 1. The infotainment system 7 has a display device 8 with an input device 10 formed, for example, by a touch-sensitive display area 9. The display device 8 is provided, for example, in the form of an LCD display. Note that the invention is not restricted to a specific display type and the display device 8 may, in principle, be designed in any given manner, e.g. also in the form of a head-up display and/or in the form of a three-dimensional display. The display device 8 may be integrated, for example, into the center stack 6, as shown schematically in FIG. 1. It may, however, also be a freely programmable instrument cluster.

Figure 2:
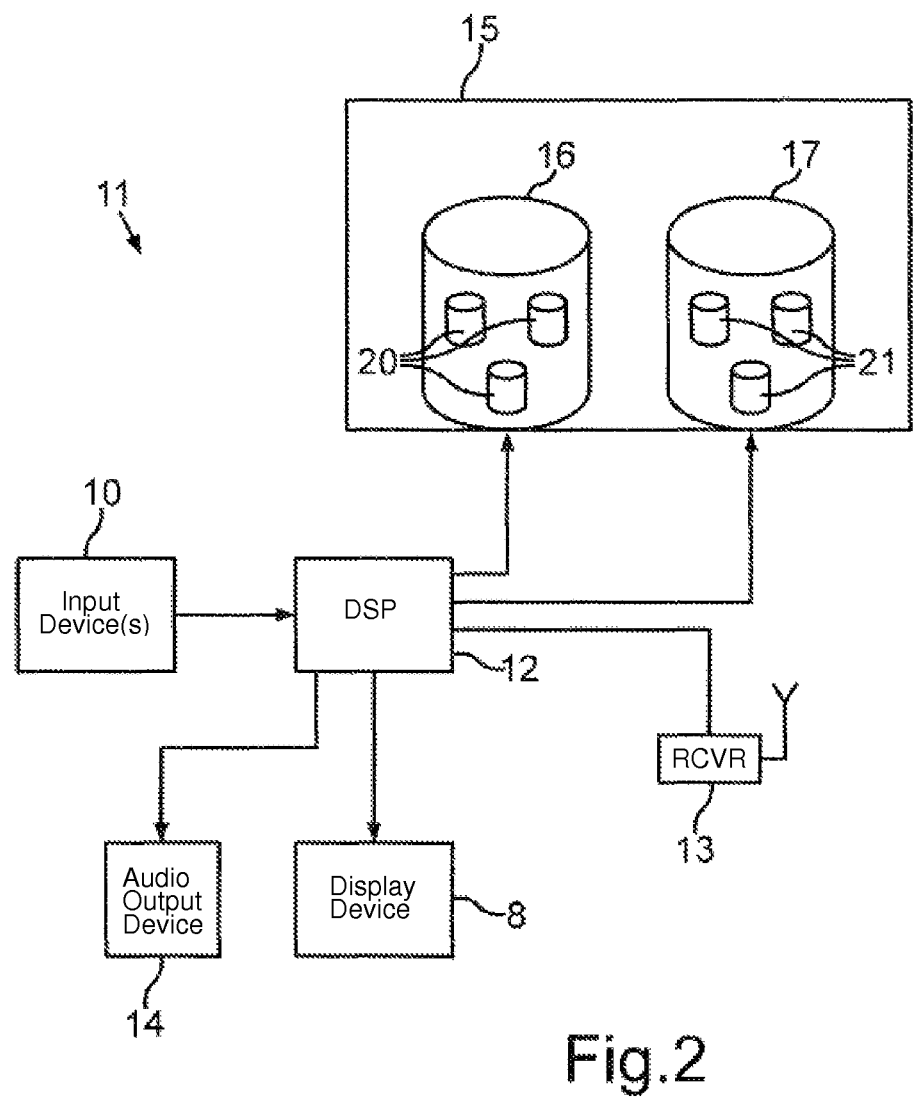
FIG. 2 is a high level block diagram of the navigation system.

The infotainment system 7 therefore contains a navigation system 11, the block diagram of which is shown in FIG. 2. A processing device 12 which is designed, for example, as a digital signal processor, is associated with the navigation system 11. The processing device 12 may optionally be a processing device common to the entire infotainment system 7. The processing device 12 is coupled to and controls the display device 8. The processing device 12 is furthermore connected to the input device 10 which serves to perform inputs. As already explained, this input device 10 may be formed by the touch-sensitive display area 9. Additionally or alternatively, the display device 10 may also be a separate keypad, a joystick and/or a voice recognition system.

The processing device 12 is furthermore coupled to a navigation receiver 13 which is designed to receive position data of the motor vehicle 1. A GPS receiver, for example, can be used as the navigation receiver 13. Optionally, the processing device 12 may also be connected to a vehicle bus, in particular the CAN bus, in order to receive, for example, odometry data.

If a specific destination is selected by the user, the processing device 12 can calculate a navigation route via which the motor vehicle 1 can be guided to the specified destination. The corresponding navigation instructions which then guide the driver to the selected destination may be output, on the one hand, via the display device 8 and, on the other hand, optionally audibly also using a loudspeaker 14. The processing device 12 accesses a storage device denoted in its entirety as 15 during the calculation of the navigation route.

Interest is focused here on the performance of a search for possible destinations. On the input device 10, the user can perform a search input on the basis of which the processing device 12 then searches for possible destinations in the storage device 15. Two separate databases are stored in the storage device 15, e.g. in a common memory, i.e. a first database 16 and a second database 17. In addition, a navigation map is also provided in order to then geographically resolve the found destinations or locate them in the real world.

Figure 3:
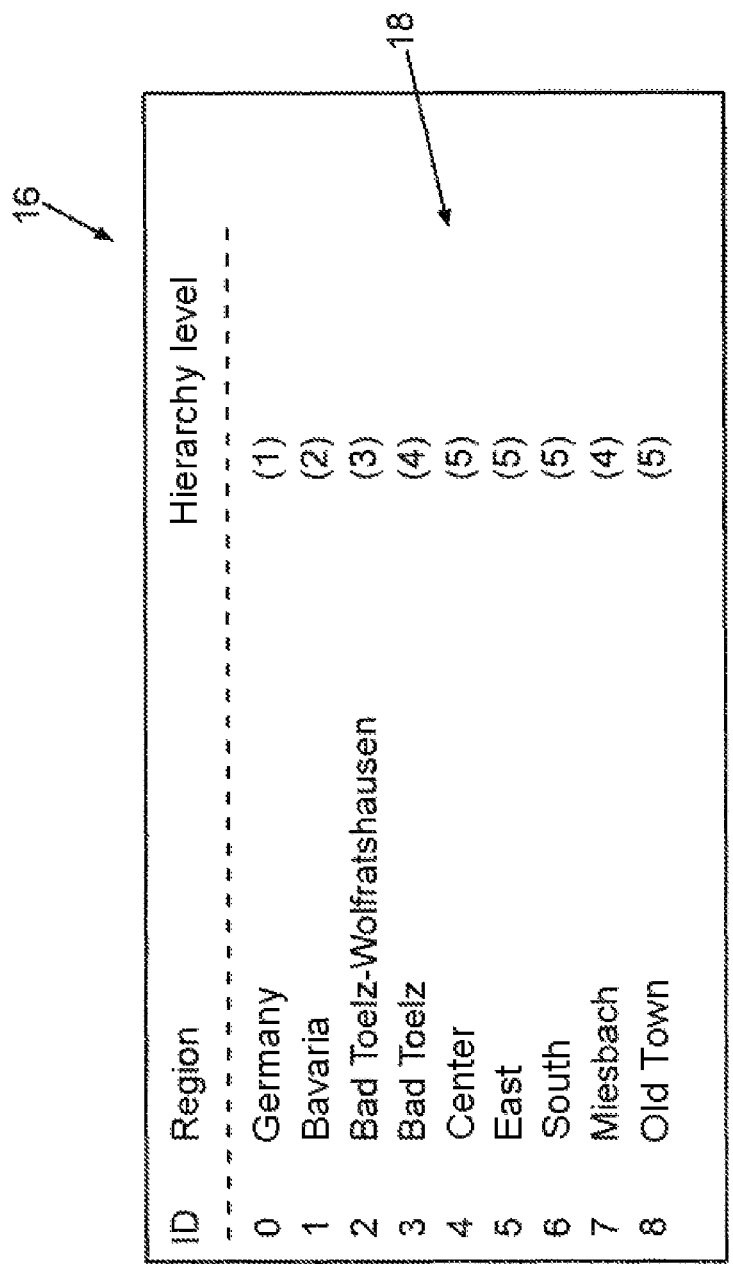
FIG. 3 shows the structure of a first database.

The structure of the first database 16 of the search index will now be explained in detail with reference to FIG. 3. The first database 16 is provided in the form of a table and contains a multiplicity of database entries 18 which are arranged accordingly in the index table. The table contains three columns: A first column, designated as "ID", enters the serial number of the respective database entry 18 in the sequence. The core of the first database 16 is formed by a second column in which geographical regions or areas are indicated. Each database entry 18 indicates a geographical area. The database entries 18 or the geographical regions are arranged hierarchically in a plurality of hierarchy levels and are stored according to a tree structure in such a way that a higher-order region is immediately followed by all subordinated regions belonging to this region. The hierarchy levels are indicated in the third column. These hierarchy levels correspond, in particular, to the respectively applicable political administrative structure of the respective country. As is evident from FIG. 3, the country alone (in this case "Germany") has the highest hierarchy level "1". The federal provinces are indicated in the second hierarchy level "2", the further subordinated regions in the third hierarchy level "3", the towns in the hierarchy level "4", etc. The database entry "Germany" is followed by all regions belonging to the region "Germany". The database entry "Bavaria" is followed by all regions belonging to "Bavaria", etc. The respective regions can optionally be arranged in alphabetical order within the same hierarchy level.

Optionally, the database entries 18 in the first database 16 can also be stored in compressed, in particular delta-compressed, form.

Figure 4:
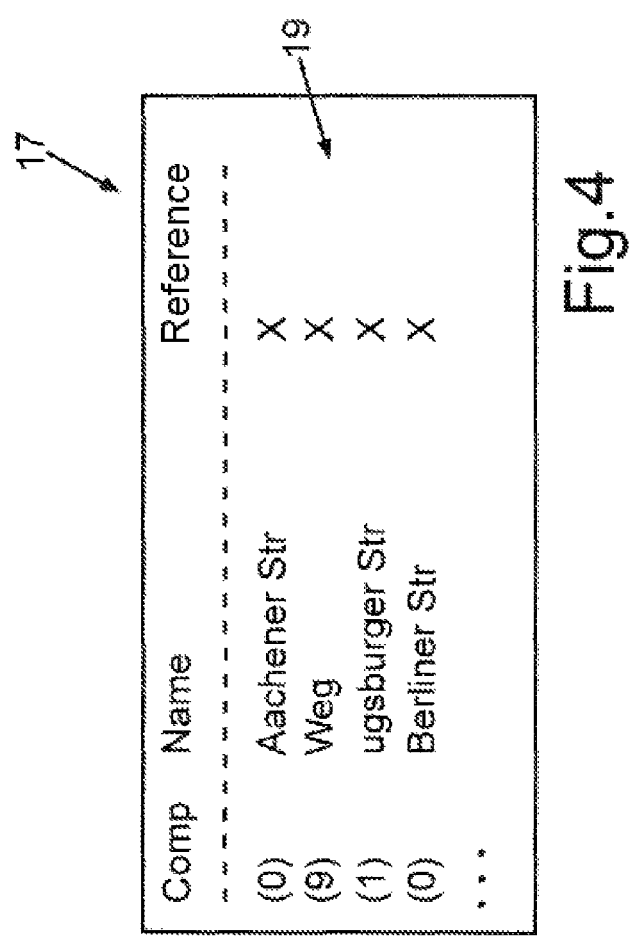
FIG. 4 shows the structure of a second database.

However, the compression proves to be particularly advantageous in the second database 17, the structure of which is shown schematically in FIG. 4. Database entries 19 which indicate street names and/or special destinations (referred to as "Points of Interest") are indicated in the second database 17. These street names and/or special destinations are delta-compressed so that the number of initial letters that are to be accepted from the respective immediately preceding database entry 19 is indicated for each database entry 19 in the first column "Comp". In the example embodiment according to FIG. 4, "Aachener Strasse" is stored as the first database entry 19. No letters from a preceding entry are accepted. In the second database entry 19, nine letters are accepted from the preceding database entry 19, i.e. the initial part "Aachener". The second database entry 19 consequently reads "Aachener Weg". In the third database entry 19, only the first letter "A" is accepted, so that "Augsburger Strasse" is indicated in the third database entry 19. The database entries 19 are preferably stored alphabetically in the second database 17.

The database entries of the second database may additionally, in each case, contain a reference to the specified navigation map in order to be able finally to geographically locate the found destinations. Alternatively, the database entries of the second database can also be referenced from the navigation map, insofar as the data format of the navigation map permits or provides this.

With further reference to FIG. 2, the first database 16 and/or the second database 17 can be divided into a plurality of subdatabases 20 and 21. The subdatabases 20, 21 then contain only a subset of the respective database entries 18 and 19. Each subdatabase 20, 21 may be provided in the form of a separate file which is stored in the memory 15. The subdivision into a plurality of subdatabases 20, 21 may be carried out, for example, in such a way that larger areas, such as, for example, the USA or Europe, are divided into a plurality of smaller regions, for example into countries or federal provinces, and a separate subdatabase 20, 21 is provided in each case for each subarea. In performing the search, the processing device 12 can then copy or load one or more of the subdatabases 20, 21 from the memory 15 into a volatile main memory and then search for the matching database entries. This reduces the processing time to a minimum.

A method according to one embodiment of the invention will now be explained in detail with reference to FIG. 5.

In a first step S1, the processing device 12 receives a search input which the user performs on the input device 10. This may initially involve a partial input which contains, for example, only one search term. In a further step S2, the processing device 12 searches the first database 16, or at least one of the subdatabases 20, for matching database entries 18 depending on the received search input. The found database entries 18 are combined in a first results lists according to step S3.

Independently therefrom, simultaneously or subsequently, the processing device 12 also searches the second database 17 for matching database entries 19 depending on the same search input. The search for matching street names and/or special destinations is carried out according to step S4. According to step S5, the found database entries 19 from the second database 17 are combined in a second results list.

In a further step S6, the processing device 12 checks the references of the found database entries 19 in the second results list. If a reference refers to the "ID" of a found region from the first results list, these two database entries 18, 19 are combined to form an entry pair and are included in a selection list as a possible destination according to step S7. Those database entries 18, 19 which undergo no allocation are discarded according to step S8. The selection list is then displayed on the display device 8 according to step S9.

Figure 5:
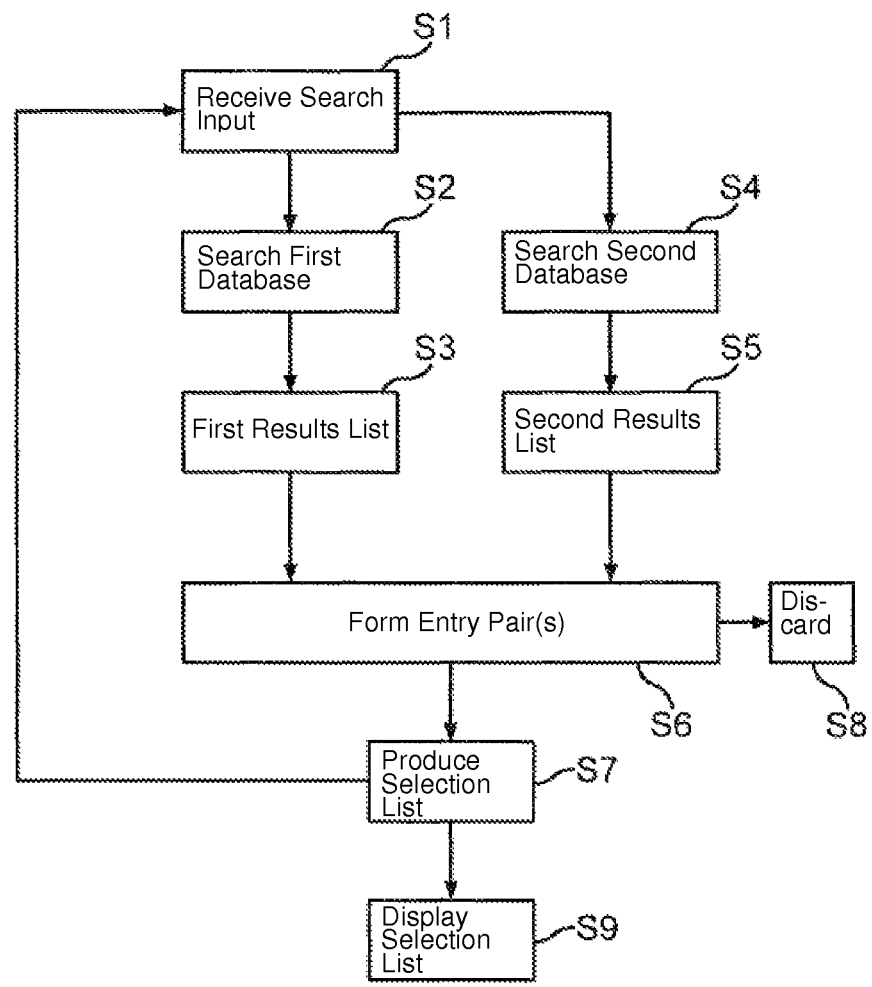
FIG. 5 is a flow diagram of a method according to one embodiment of the invention.

As indicated in FIG. 5, the method is carried out repeatedly while the user completes his search input. The method is carried out, for example, after each new character of the search input or after each new search term, and the selection list is updated according to the respective more complete search input. A separate confirmation of the search input by the user is not required, but can be performed optionally at the end of the search input.

The overall search time is minimal, since the two databases 16, 17 are searched by means of a linear search with a "skip" function in which parts of the list can be passed over. The special sequence of the respective database entries 18, 19 in which these database entries 18, 19 are stored in the respective database 16, 17 furthermore ensures the reduction in the search time.

If, for example, "München Hanau" is entered as the search input, the search in the first database 16 produces the following first results list:

München

Hanau

The search in the second database 17, in turn, produces a second results list, i.e.:

Münchener Strasse

Hanauer Strasse

The processing device 12 then establishes that a reference is indicated in Hanauer Strasse to the region "München", but the database entry "Münchener Strasse" contains no reference to the region "Hanau". Consequently, only a single combination is possible, i.e.: "Hanauer Strasse in München". This possible destination is then output in the selection list.

According to a further example, the search input "Ham Str Munch" at the location München produces the following selection list:

Hamburger Strasse in München

Hammersbacher Strasse in München

Münchener Strasse in Hammelburg

Edvard-Munch Strasse in Hamburg

If a specific region is found during the searching of the first database 16, all regions subordinated to this region can also be additionally included in the first results list according to step S3 (cf. FIG. 5). The reference indicated in the second database 17 refers namely to the smallest region, so that, on the whole, a precise allocation of the database entries 18, 19 to one another is possible.

The possible destinations may also be prioritized in the output selection list and may be output accordingly in a specifically defined sequence. The processing device 12 may, in each case, allocate a priority value to each possible destination in the selection list, said priority value being dependent on at least one of the following parameters:

a frequency with which the respective destination has previously been selected for calculating the navigation route, and/or a current geographical position of the motor vehicle 1, and/or a distance to the respective destination from the current position of the motor vehicle 1, and/or a degree of correspondence between the respective destination and the search input, and/or an administrative type of the respective destination, and/or a number of inhabitants of the respective destination, if a town has been found as the destination.

In the exemplary embodiment, the user can also be provided with the facility to include the displayed possible destinations individually in a favorites list. In a subsequent later search, those destinations which are included in the favorites list can then be placed in foremost position. If a found destination is selected by the user, it can also be provided that this destination is, for example, automatically included in the favorites list. The relationship may also apply that the more frequently a destination is selected, the higher its priority value or its weighting for the prioritization.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a navigation system of a motor vehicle to search for possible destinations, the navigation system being equipped with a processing device, wherein the method comprises the acts of:
   receiving, by the navigation system, a search input performed by a user; searching a first database for matching database entries depending on the received search input, and providing a first results list of matching database entries, wherein the first database stores database entries indicating geographical regions;
   searching a second database for matching database entries depending on the same received search input, and providing a second results list of matching database entries independently of the first results list of matching database entries, wherein the second database stores database entries indicating street names and/or special destinations, and wherein a reference to at least one geographical region is indicated in the second database for each street name and/or special destination;
   allocating matching database entries from the second results list to the database entry from the first results list to which a respective reference refers, so that entry pairs are determined which, in each case, contain a matching database entry from the first results list and a matching database entry from the second results list; and
   controlling a display device to display a selection list comprising the entry pairs as the possible destinations.

2. The method according to claim 1, wherein the database entries in the second database are stored alphabetically.

3. The method according to claim 2, wherein
the geographical regions indicated in the first database are arranged hierarchically into at least two hierarchy levels so that, for each region of a specific hierarchy level, a plurality of regions belonging geographically to said region are allocated to a hierarchy level subordinated thereto.

4. The method according to claim 1, wherein
the geographical regions indicated in the first database are arranged hierarchically into at least two hierarchy levels so that, for each region of a specific hierarchy level, a plurality of regions belonging geographically to said region are allocated to a hierarchy level subordinated thereto.

5. The method according to claim 4, wherein
the geographical regions indicated in the first database are stored according to a tree structure in a sequence such that a specific region is immediately followed by all subordinated regions belonging to said specific region.

6. The method according to claim 5, wherein
if a region from a specific hierarchy level is found depending on the received search input, all regions subordinated to said region are additionally included in the first results list, and/or
if a specific region and a region subordinated thereto are found depending on the received search input, only the subordinated region is included in the first results list.

7. The method according to claim 1, wherein data in the first and/or the second database is stored in a compressed form.

8. The method according to claim 7, wherein the data is stored in a delta-compressed form.

9. The method according to claim 1, wherein
the first and/or the second database comprise a plurality of subdatabases in which a subset of the database entries is, in each case, stored.

10. The method according to claim 9, wherein
at least one of the subdatabases is loaded via the processing device from a non-volatile memory, in which the first database and the second database are stored, into a volatile main memory during a search for the possible destinations, and
the at least one of the subdatabases is searched for the matching database entries in the subdatabase of the volatile main memory.

11. The method according to claim 1, wherein the acts of searching the first database and the second database are carried out via a linear search.

12. The method according to claim 11, wherein the linear search comprises a skip function.

13. The method according to claim 1, wherein
if the received search input is continuously edited in an input field by the user, a previously performed partial input is already repeatedly received, in each case, by the processing device during search input and the selection list is continuously updated depending on a respective current partial input.

14. The method according to claim 13, wherein
the selection list is updated after each new character or after each new search term of the received search input depending on the respective current partial input.

15. The method according to claim 1, wherein
a priority value is assigned, in each case, to the possible destinations, and
a sequence of the possible destinations in the selection list is determined depending on priority values.

16. The method according to claim 15, wherein
the priority values are determined depending on one or more of the following parameters:

a frequency with which a respective destination has previously been selected for calculating a navigation route, a current position of the motor vehicle, a distance to the respective destination from a current geographical position of the motor vehicle, a degree of correspondence between the respective destination and the received search input, an administrative type of the respective destination, and a number of inhabitants of the respective destination when a town is the respective destination.

17. A navigation system for a motor vehicle, the navigation system comprising:

a display device;

first and second databases;

an input device; and a processing device operatively coupled to the display device, the first and second databases, and the input device;

wherein the processing device is configured to execute a program to:

receive, by the navigation system, the search input performed by the user of the input device;

search a first database for matching database entries depending on the received search input, and provide a first results list of matching database entries, wherein the first database stores database entries indicating geographical regions;

search a second database for matching database entries depending on the same received search input, and provide a second results list of matching database entries independently of the first results list of matching database entries, wherein the second database stores database entries indicating street names and/or special destinations, and wherein a reference to at least one geographical region is indicated in the second database for each street name and/or special destination;

allocate matching database entries from the second results list to the database entry from the first results list to which a respective reference refers, so that entry pairs are determined which, in each case, contain a matching database entry from the first results list and a matching database entry from the second results list; and control a display device to display a selection list comprising the entry pairs as the possible destinations.

18. A motor vehicle, comprising:

a navigation system, the navigation system comprising:

a display device;

first and second databases;

an input device; and a processing device operatively coupled to the display device, the first and second databases, and the input device;

wherein the processing device is configured to execute a program to:

receive, by the navigation system, the search input performed by the user of the input device;

search a first database for matching database entries depending on the received search input, and provide a first results list of matching database entries, wherein the first database stores database entries indicating geographical regions;

search a second database for matching database entries depending on the same received search input, and provide a second results list of matching database entries independently of the first results list of matching database entries, wherein the second database stores database entries indicating street names and/or special destinations, and wherein a reference to at least one geographical region is indicated in the second database for each street name and/or special destination;

allocate matching database entries from the second results list to the database entry from the first results list to which a respective reference refers, so that entry pairs are determined which, in each case, contain a matching database entry from the first results list and a matching database entry from the second results list; and control a display device to display a selection list comprising the entry pairs as the possible destinations.

* * * * *